United States Patent [19]

Fischer et al.

[11] Patent Number: 4,491,549

[45] Date of Patent: Jan. 1, 1985

[54] DEVICE FOR DISPERSING A SECOND PHASE IN A FIRST PHASE

[75] Inventors: Edgar Fischer, Frankfurt am Main; Wolfgang Sittig, Hofheim am Taunus, both of Fed. Rep. of Germany

[73] Assignee: Hoechst Aktiengesellschaft, Frankfurt am Main, Fed. Rep. of Germany

[21] Appl. No.: 409,942

[22] Filed: Aug. 20, 1982

[30] Foreign Application Priority Data

Aug. 22, 1981 [DE] Fed. Rep. of Germany ....... 3133314

[51] Int. Cl.³ .................................................. B01F 3/04
[52] U.S. Cl. ............................ 261/36 R; 209/170; 210/221.2; 239/558; 261/77; 261/124; 422/231; 435/313
[58] Field of Search ............... 261/36 R, 77, 122–124; 422/227, 231; 435/313–315; 239/556–559, 567, 550, 561; 210/629, 221.2; 209/170

[56] References Cited

U.S. PATENT DOCUMENTS

| | | | |
|---|---|---|---|
| 837,571 | 12/1906 | Jackson | 239/558 X |
| 1,079,281 | 11/1913 | Ackroyd | 239/558 X |
| 1,223,033 | 4/1917 | Cole | 261/122 X |
| 1,537,265 | 5/1925 | Ruth, Jr. | 261/122 |
| 1,762,314 | 6/1930 | Sutphen et al. | 261/124 |
| 1,964,345 | 6/1934 | Feller | 261/122 |
| 1,971,852 | 8/1934 | Goebels | 261/124 X |
| 2,121,948 | 6/1938 | Borland | 239/561 X |
| 2,292,897 | 8/1942 | Nielsen | 261/77 X |
| 2,624,657 | 1/1953 | Anderson | 261/124 X |
| 3,081,289 | 3/1963 | Cheney et al. | 261/124 X |
| 3,923,605 | 12/1975 | Gedde | 435/313 X |
| 4,032,300 | 6/1977 | Parker et al. | 239/556 X |
| 4,161,426 | 7/1979 | Kneer | 435/313 |
| 4,198,359 | 4/1980 | Todd | 261/124 X |
| 4,342,876 | 8/1982 | Klingman | 261/77 X |

FOREIGN PATENT DOCUMENTS

| | | | |
|---|---|---|---|
| 856225 | 6/1940 | France | 261/77 |
| 680753 | 9/1979 | U.S.S.R. | 261/123 |

Primary Examiner—Richard L. Chiesa
Attorney, Agent, or Firm—Curtis, Morris & Safford

[57] ABSTRACT

A device for dispersing a second phase in a first phase is provided, wherein gas inlet means are arranged at the bottom of a vessel. The outlet parts of these inlet elements have a varying distance to the bottom, this distance decreasing towards the center of the bottom. The distance of the outer outlet parts of the elements to the bottom, for those located near to the periphery, is from 15 to 40% of the diameter of the bottom.

8 Claims, 1 Drawing Figure

U.S. Patent  Jan. 1, 1985  4,491,549
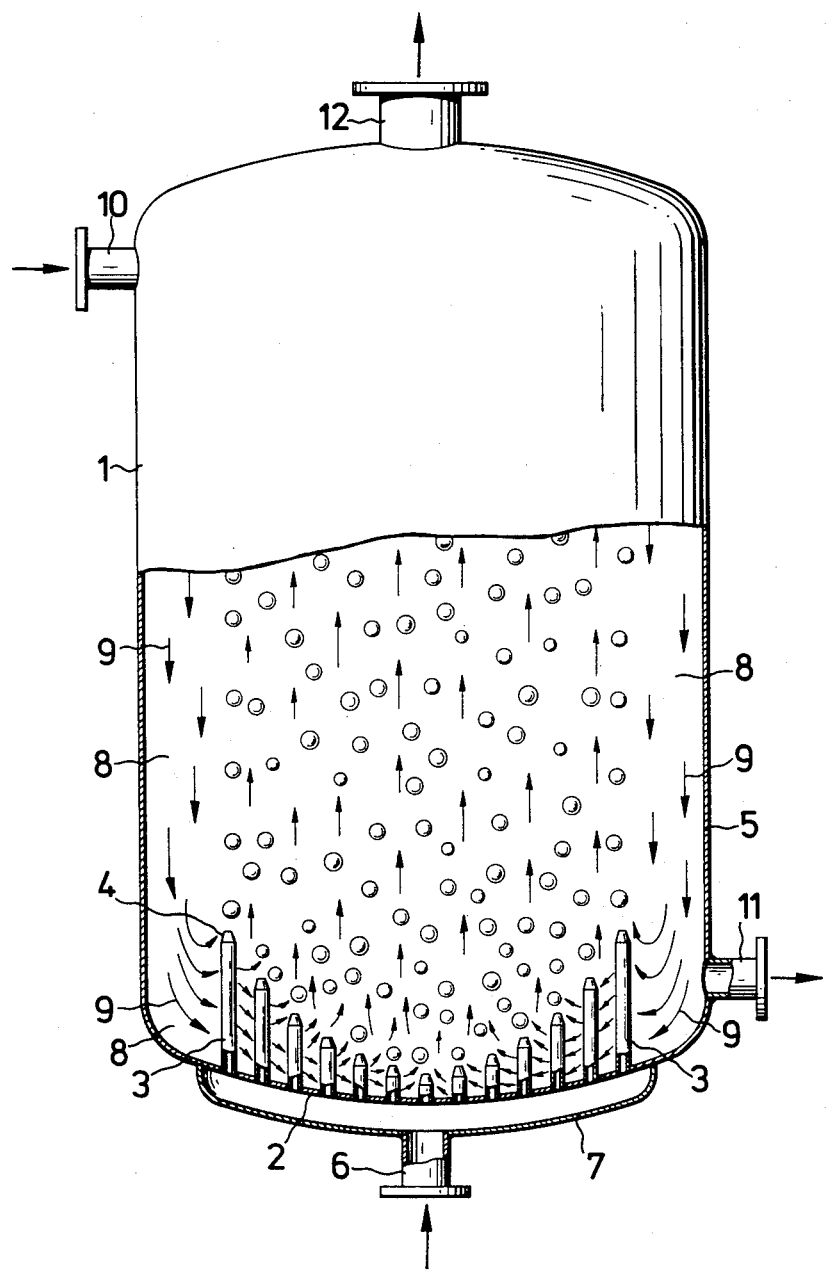

DEVICE FOR DISPERSING A SECOND PHASE IN A FIRST PHASE

It is known to disperse a second phase in a first phase miscible or immiscible therewith, for example a gas in a liquid. The second phase is introduced into the first phase and the phase to be dispersed is distributed in the first phase by suitable means, for example frits, jet pipes, rings of jet pipes, jets of liquids, gassing agitators and the like over the vertically projected cross-section of the first phase. Using these distributing means, neither satisfactory distribution of the phase to be dispersed, nor its dispersion into small bubbles or droplets having very large sufaces, with respect to their volume, is obtained without additional energy dissipation. It is moreover known to use the kinetic energy produced in a mammoth pump reactor for the dispersion of bubbles.

It is therefore an object of the invention to provide a device suitable for dispersing a second phase in a first phase without additional energy being required.

According to an aspect of the invention this object is achieved by a device wherein inlet means are located at the bottom of a vessel, the outlet openings of said inlet means having a varying distance to the bottom and this distance decreasing towards the center of the bottom.

The distance of the outer outlet openings to the bottom may be from 15 to 40 and most, preferably 20 to 40, preferably 20 to 30, % of the diameter of the bottom and the sum of the clear cross sections of the outlet openings may be from 0.10 to 20, preferably 0.2 to 4, % of the total surface area of the bottom. The vessel may have any shape cross-section, for example a quadratic or rectangular cross-section, and the like. A vessel having a circular cross-section is preferred, however, Suitable inlet means can be vertical pipes, in particular jet pipes. The diameter of the pipes may be up to 120 mm. It may be advantageous to arrange the inlet means at the bottom such that an annular zone is formed between the wall of the vessel and the inlet means, the cross-section whereof amounting to 20–80% of the total cross-section of the bottom.

The advantages reached with the present invention reside in the fact that a free contact of the first phase (liquid, solid) returning in a loop to each outlet opening of the inlet means is rendered possible by arranging a great number of individual inlet means at the bottom of the dispersion vessel. A uniform distribution or contact of the first phase throughout the whole bottom, i.e. the uniform contact of the first phase with the individual outlet openings is substantially improved by reducing the distance between the outlet openings of the inlet means and the bottom of the vessel, this distance having a maximum value in the outer zone and a minimum value in the center of the bottom. The first phase returning in a loop passes below the outlet openings of the inlet means, then flows parallel to the bubbles or droplets formed at the outlet openings and envelops the latter. The diameter of the bubbles of droplets and their size distribution may be given solely by adequately shaping the outlet openings. It was furthermore surprising that a loop-shape movement of the first phase is obtained without deflection means only as a result of the particular arrangement of the inlet means.

The device is suitable for dispersing gases in liquids, and for dispersing miscible and immiscible liquids in a second liquid. The device may moreover be used advantageously in gas washing operations, in particular for disinfecting gases, for disinfecting liquids, for mass transfer, for introducing energy, for example for drying gases, for drying powders, for saturating liquids with gases, for example for supplying oxygen to microorganisms in suspensions, for thermal reactions by the introduction of gases, by the introduction of liqids, for extractions in a system liquid/liquid or liquid/solids.

The present invention will be illustrated hereinafter in greater detail with reference to the accompanying drawing which represents one possible embodiment of the device according to the invention and in the following Examples.

The FIGURE is a partly sectional lateral view of the device according to the invention.

Referring now to the drawing: Vessel 1, the bottom 2 of which may be double-walled, is provided with inlet means 3 at said bottom. The outlet openings 4 of said inlet means 3 have a varying distance to said bottom 2. Said distance decreases towards the center of the bottom and has a maximum value in the peripheral zone. Said inlet means 3 are arranged at said bottom in a manner such that an annular zone 8 is formed between the wall 5 of the vessel and the periphery of said inlet means 3 in which zone no inlet means are located, to permit a passage to the phase 9 back-flowing (as indicated by the down-pointing arrows) to said inlet means. The second phase (for example gas bubbles) may be fed to said inlet means 3 through the connection piece 6 by passing through the interspace between the second bottom 7 and said bottom 2. The connection pieces 10, 11 and 12 serve as discharge and inlet pipes, respectively, of the phases.

Here, the inlet means comprise jet pipes rising from the bottom 2 so that their nozzles are elevated vertically above the bottom, more so at the periphery than at the center. This permits back flow of the phase 9 past the jet pipes of the inlet means 3 so that the returned phase 9 is distributed more-or-less evenly along the bottom 2.

EXAMPLE 1

When operating with a gassing reactor of 600 mm diameter, of 2.40 m height and of 1.80 m liquid level and provided with a conventional jet pipe for gassing, gas contents of 19% were reached.

The gas content was increased to 24.5% when applying the claimed inlet system. The diameter of the gassed area was 450 mm, the number of elements in the gas inlet means was 56 and the diameter of the gas outlet openings was 6 mm. The gas throughput was about 100 m$^3$/h. The aeration speed, referred to the inner cross-section, was 0.1 m/s. The specific mass transfer coefficient raised from 124 h$^{-1}$ to 186 h$^{-1}$.

EXAMPLE 2

When using a gassed fluidized bed drier of 2 m diameter and of 1.00 m feed level operating troubles were observed which started with the formation of large bubbles followed by a non-uniform solids distribution. As a result, solid packings with superheated zones were formed in the peripheral zone. Finally, agglomerates of 150 mm diameter were formed, so that operation had to be stopped. To overcome the difficulties encountered, 183 gas inlet elements were arranged at the bottom of the drier at an area of 1.6 m diameter, the total cross-section of openings of said means amounting to 1% of the total surface of the bottom and said inlet means having a height of 200 mm in the peripheral zone and of 20 mm in the center of the bottom.

A steady operation was reached in this case. Temperature peaks and packings of solids were not observed.

EXAMPLE 3

When operating with a liquid/liquid extraction column of 800 mm diameter and 10 m height in order to recover formic acid from aqueous sodium chloride spinning solution by means of tributyl phosphate, repeated operation failures were observed, as very fine droplets had a low tendency to coalesce. A uniform spectrum of droplets of 6 mm diameter was possible when applying the device according to the invention provided with 129 inlet pipes for the droplets of 250 mm height in the peripheral zone and of 20 mm height in the center and having a total diameter of 600 mm. As a result, the extraction output was increased by 30% and no more failures occurred.

What is claimed is:

1. A device for dispersing a second phase in a first phase, comprising a vessel containing the first phase having a bottom and inlet means supplying said second phase arranged at the bottom of said vessel, the inlet means including a plurality of inlet pipe elements each rising substantially vertically from said bottom to outlet openings of said inlet means, said pipe element outlet openings having a height over the bottom, and this height decreasing from the periphery of the bottom toward the center of the bottom, such that at least a portion of the first phase flows past outer ones of said inlet elements towards said center to ensure even distribution of the first and second phases over the cross section of the vessel.

2. The device of claim 1, wherein the height of the peripheral outlet openings over said bottom is from 15 to 40% of the diameter of the bottom.

3. The device of claim 1, wherein the sum of the inner cross sections of the outlet openings is from 0.10 to 20% of the surface area of the bottom.

4. The device of claim 1, wherein the outlet openings have altogether a cross-section of up to 100 cm$^2$.

5. The device of claim 1, wherein said inlet means are arranged at the bottom of said vessel in a manner such that an annular zone is formed between the wall of the vessel and said inlet means not provided with inlet means, the cross-section of said zone amounting to 20–80% of the total cross-section of the bottom.

6. The device of claim 1, wherein the height of the peripheral outlet openings over said bottom is from 20 to 30% of the diameter of the bottom.

7. The device of claim 1, wherein the sum of the inner cross sections of the outlet openings is from 0.2 to 4% of the surface area of the bottom.

8. A device for dispersing a second phase in a first phase, comprising a vessel containing said first phase having a bottom and inlet means supplying said second phase arranged at the bottom of said vessel for injecting the second phase into the first phase to cause a loop-type motion in the first phase, the inlet means including a plurality of inlet pipe elements each rising substantially vertically from said bottom to outlet openings of said inlet means, said pipe element outlet openings having a height over the bottom of the vessel, this height decreasing from the periphery towards the center of the vessel, such that at least a portion of the first phase flows past outer ones of said inlet elements towards said center to ensure even distribution of the first and second phases over the cross section of the vessel.

* * * * *